(12) United States Patent
Gordon et al.

(10) Patent No.: US 9,222,148 B2
(45) Date of Patent: Dec. 29, 2015

(54) DEVICE AND METHOD FOR RECOVERY OR EXTRACTION OF LITHIUM

(75) Inventors: John Howard Gordon, Salt Lake City, UT (US); Sai Bhavaraju, West Jordan, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 1031 days.

(21) Appl. No.: 13/285,721

(22) Filed: Oct. 31, 2011

(65) Prior Publication Data

US 2012/0103826 A1      May 3, 2012

Related U.S. Application Data

(60) Provisional application No. 61/408,332, filed on Oct. 29, 2010.

(51) Int. Cl.
  *C22B 26/12* (2006.01)
  *C25B 1/14* (2006.01)

(52) U.S. Cl.
  CPC .. *C22B 26/12* (2013.01); *C25B 1/14* (2013.01)

(58) Field of Classification Search
  USPC .................................. 205/471; 204/529, 520
  See application file for complete search history.

(56) References Cited

U.S. PATENT DOCUMENTS

| 4,036,713 A | 7/1977 | Brown |
| 5,258,106 A * | 11/1993 | Habermann et al. .......... 205/510 |
| 5,882,811 A * | 3/1999 | Kawakami ...................... 429/49 |
| 6,770,187 B1 * | 8/2004 | Putter et al. .................... 205/560 |
| 2011/0203929 A1 * | 8/2011 | Buckley et al. ............... 204/537 |

FOREIGN PATENT DOCUMENTS

| JP | 2009269810 | 11/2009 |
| JP | 2009270189 | 11/2009 |
| WO | WO-2009131628 | 10/2009 |

OTHER PUBLICATIONS

Kuribayashi, Isao "Bibliographical Data and English Language Abstract", Japanese Patent App. JP-2009-269810, (Nov. 19, 2009),1.
Kuribayashi, Isao "Bibliographical Data and English Language Abstract", Japanese Patent App. JP-2009-270189, (Nov. 19, 2009),1.
Yoon, Yeo B., "International Search Report", PCT App. No. US2011/058645 (Corresponding to U.S. Appl. No. 13/285,721, (May 17, 2012),1-3.

(Continued)

*Primary Examiner* — Arun S Phasge
(74) *Attorney, Agent, or Firm* — David Fonda (57) ABSTRACT

A method for recovering and extracting lithium from a feed liquid that may have a mixture of lithium and non-lithium salts present in the feed liquid. Salts of varying solubility are precipitated out of the feed liquid using water evaporation or other techniques. Pure lithium hydroxide is obtained using electrolysis or electro-dialysis processes in combination with a lithium ion selective inorganic membrane such as LiSICON. The negative effect of sodium and potassium on the lithium ion selective inorganic membrane is reduced by reversing the polarity of the current placed across the membrane.

19 Claims, 7 Drawing Sheets

(56) References Cited

OTHER PUBLICATIONS

Yoon, Yeo B., "Written Opinion of the International Searching Authority", PCT App. No. US2011/058645 (Corresponding to U.S. Appl. No. 13/285,721, (May 17, 2012),1-4.

Graber, et al., "Behavior of LiOH-H2O Crystals Obtained by Evaporation and by Drawing Out", Cryst. Res. Technol. 43(6), (2008), Wiley-VCH Verlag GmbH & Co. KGaA, Weinheim, (Mar. 20, 2008),616-625.

* cited by examiner

DEVICE AND METHOD FOR RECOVERY OR EXTRACTION OF LITHIUM

CROSS-REFERENCE TO RELATED APPLICATION

This application claims the benefit of U.S. Provisional Patent Application Ser. No. 61/408,332, filed Oct. 29, 2010, and entitled "DEVICE AND METHOD FOR RECOVERY OF EXTRACTION OF LITHIUM," the entire disclosure of which is hereby incorporated by reference.

FIELD OF THE INVENTION

The present invention relates to methods for lithium recovery generally and to methods for recovering lithium compounds from a feed liquid comprising lithium and non-lithium salts using a plurality of treatments to concentrate lithium compounds and intermediate products. The invention also teaches increasing the concentration of lithium by electro-dialysis or electrolysis using an inorganic lithium-selective membrane.

BACKGROUND OF THE INVENTION

As lightweight electrical energy storage batteries for transportation, personal devices, powered hand tools, and appliances become more plentiful, the demand for metallic lithium compounds becomes more intense. The resulting techniques to recover and purify lithium from lithium-containing materials allow for either recovery or extraction of the lithium content which can then be processed into a final form suitable for end use. Examples of such lithium sources include lithium containing ores solubilized in appropriate solvents, recovered electrolytes from lithium batteries, lithium containing organic streams among others. Lithium is particularly useful for lightweight batteries because of its very low equivalent weight of 6.941 and because of its small atomic size with allows it to intercalate into anode or cathode materials more readily than cations of larger atomic size. Organo-lithium compounds are also widely used in synthesis and production of various organic compounds and polymers.

Thus, while lithium is useful in many applications, challenges still exist in recovering lithium from known sources. Accordingly, it would be an improvement in the art to augment or even replace certain current lithium recovery techniques and methods.

BRIEF SUMMARY OF THE INVENTION

The present invention provides methods for producing a lithium product or intermediate product where the lithium product or intermediate product has a lower concentration of non-lithium impurities than the feed liquid used to produce the product or intermediate product. In one exemplary embodiment a feed liquid comprising a mixture of materials including lithium and non-lithium metal salts. The feed liquid is treated to precipitate non-lithium salt impurities so as to increase the concentration of lithium. In certain exemplary embodiments the treatment comprises a pre-treatment. In other certain exemplary embodiments the treatment comprises precipitation by water evaporation.

One non-limiting method to produce high purity lithium hydroxide, which in turn can be converted to other lithium compounds using standard methods, utilizes a conductive inorganic solid-electrolyte membrane which is selective for lithium in an electrolysis or electro-dialysis process. In the disclosed process, lithium cations from a solution containing impurities pass from a first chamber, through the lithium-selective membrane, to a second chamber where the impurity concentration is lower than the first chamber.

Lithium-conducting membranes are used to transport lithium ions. Such membranes are commercially available from Ohara Glass, which produces a glass-ceramic conductive to lithium and which has been demonstrated in batteries. Ceramatec, Inc. also produces a ceramic lithium conductor called LiSICON which is a lithium ion conductor. A typical LiSICON composition is substantially $Li_{1+x}Zr_2Si_xP_{3-x}O_{12}$ where $0<x<3$. Alternatively, a particularly well suited material that may be used is lithium aluminum titanium phosphate. Lithium aluminum titanium phosphate has a composition that is substantially, $Li_{(1+x+4y)}Al_xTi_{(1-x-y)}(PO_4)_3$ where $0<x<0.4$, $0<y<0.2$.

Divalent cations such as calcium or magnesium cannot enter the lattice structure of the lithium-conductive membrane because the sites of mobile lithium ions would lose electro-neutrality if a divalent cation enters the crystal lattice. Also, the structure favors transport of lithium cations with an oxidation state of +1. According to R. D. Shannon (1976), "Revised effective ionic radii and systematic studies of interatomic distances in halides and chalcogenides," *Acta Cryst* A32: 751-767, the crystal ionic radii of monovalent lithium, sodium, and potassium with a charge of +1 are 76, 102, 138 picometers respectively.

While the structure favors lithium because of its size relative to sodium or potassium and is therefore predominantly selective, the presence of sodium and potassium in a feed stream along with the lithium can pose problems because in an electro-dialysis cell or electrolysis cell, lithium, sodium and potassium if all present are electro-statically drawn toward the membrane. While lithium will enter the membrane and pass through, sodium and potassium may enter the membrane, occupying a membrane surface site normally occupied by lithium, and then their larger size will either stress the membrane by distorting the lattice or prevent lithium from entering the membrane surface and passing through by blocking the site. For this reason, it is desirable to minimize the concentration of sodium and potassium ions in a feed stream.

Importantly, it has been found that the effects of sodium and potassium entering a membrane can be reversed by reversing the current direction or polarity of the cell, which causes sodium and potassium to exit the membrane. Thus, by periodically running an electro-dialysis process or electrolysis cell in reverse, the effects of the sodium and potassium may be minimized and the process may be very effective. By way of non-limiting example, if the feed stream has a lithium ion concentration 20 times higher than the sodium and potassium concentration, then performance can be sustained by reversing the current approximately $\frac{1}{20}^{th}$ of the time.

The presence of divalent alkaline earth and some trivalent cations can also pose a problem, not because they enter the membrane, but because they have low solubility in high pH solutions and can form scale or precipitate on the membrane surface which prevents transport of lithium through the membrane. To minimize this problem it is desirable to remove as much as possible divalent or trivalent cations.

This invention addresses the need to create a relatively pure lithium material using a lithium conductive separator in an electro-dialysis electrolysis or electro-synthesis cell, preparing the feed stream to the electrolytic cell by reducing the amount of sodium, potassium, and divalent or trivalent cations present relative to the amount of lithium prior to electrolysis, and to provide a method of operation which increases the tolerance of these other cations in a feed stream.

Solubility differences of the various lithium and non-lithium salts can be used to increase the concentration of lithium in a cell feed stream relative to cations that can cause a problem with the lithium conductive membrane. This can be explained through examples as will be described below.

The present invention claims a method recovery or extraction of lithium. In certain exemplary embodiments the treatment comprises precipitating lithium hydroxide from a solution containing non-lithium hydroxide salts. The lithium hydroxide precipitate may be recovered for further processing as disclosed herein. In other exemplary embodiments, the treatment comprises precipitating non-lithium salts from a solution containing lithium and non-lithium salts. Non-limiting examples of such salts include chloride and sulfate anions. Non-limiting examples of non-lithium cations include potassium, sodium, calcium, magnesium, and aluminum.

In alternative exemplary embodiments the treatment comprises re-solvating the recovered lithium hydroxide salt precipitate using an aqueous or non-aqueous solvent to produce a second feed liquid comprising lithium hydroxide in solution.

In alternative exemplary embodiments the treatment comprises feeding the second feed liquid to an electrolysis cell comprising at least one inorganic solid electrolyte membrane configured to selectively transport lithium ions, the membrane positioned to form a membrane barrier between an anolyte compartment configured with an anode and a catholyte compartment configured with a cathode. The anode and cathode are electrically coupled to a current source having a voltage potential to drive electrolysis reactions.

In alternative exemplary embodiments the treatment comprises transporting the lithium ions from a feed stock, wherein lithium is transported through the inorganic solid electrolyte membrane under the influence of an electric potential to produce the lithium product or intermediate product.

In alternative exemplary embodiments the treatment comprises a feed liquid comprising subjecting the first feed liquid to water evaporation to precipitate lithium hydroxide salt.

In alternative exemplary embodiments the treatment utilizes an electrolysis cell with at least one anode, one cathode, and one lithium ion selective inorganic membrane.

In alternative exemplary embodiments the treatment utilizes an electro-dialyzer having at least one anode, at least one cathode, at least one inorganic membrane, and at least one anion exchange membrane. In alternative exemplary embodiments the anion exchange membrane comprises a monovalent anion exchange membrane.

In alternative exemplary embodiments the treatment comprises periodically reversing the polarity of the cell. Reversing the polarity of the cell or the direction of current or the voltage potential across the membrane reverses the effects of sodium and potassium entering the membrane and can cause sodium and potassium to exit the membrane.

In alternative exemplary embodiments the lithium ion selective inorganic membrane comprises a LiSICON membrane.

In alternative exemplary embodiments the feed liquid containing lithium and non-lithium salts is evaporated to cause non-lithium salts, such as sodium and/or potassium chloride or sulfate salts, to precipitate from the feed liquid to form a second feed liquid.

In alternative exemplary embodiments the treatment comprises feeding a feed liquid, rich in lithium salts and containing some non-lithium salts to an electrolysis cell to form lithium hydroxide and non-lithium metal hydroxides. In alternative exemplary embodiments the cell comprises at least three compartments separated by an anion exchange membrane and a cation exchange membrane.

In alternative exemplary embodiments the treatment comprises water removal from a solution containing lithium hydroxide and non-lithium hydroxide salts to precipitate the lithium hydroxide from the remaining liquid. The precipitated lithium hydroxide is recovered to form a lithium product or intermediate product.

In alternative exemplary embodiments the treatment comprises re-solvating the precipitated lithium hydroxide to form a feed liquid.

In alternative exemplary embodiments the treatment comprises feeding the feed liquid to an electrochemical cell having three compartments comprising a center compartment, an anode compartment and a cathode compartment, wherein the center compartment and the cathode compartment are separated by an inorganic cation exchange membrane wherein the membrane is under the influence of an electric potential.

In alternative exemplary embodiments the treatment comprises conducting lithium through the lithium conductive membrane to form pure lithium hydroxide product or intermediate product.

In alternative exemplary embodiments the treatment comprises a method for separating lithium ions from a feed liquid comprising lithium salts in solution, sodium salts in solution, potassium salts in solution, other non-lithium salt compounds in solution or mixtures thereof.

In alternative exemplary embodiments the treatment comprises separating lithium ions from the feed liquid through an inorganic solid electrolyte membrane under the influence of an electrical field to produce a product or an intermediate product.

In alternative exemplary embodiments the feed liquid is the product of an intermediate flow output from a electrochemical cell with at least three compartments, wherein a feed liquid to the three-compartment cell is pretreated to reduce sodium ions, potassium ions, other non-lithium metal salt compounds or mixtures thereof present in the feed liquid to the three-compartment cell. The pretreatment may include evaporation of a solvent in the feed liquid to promote precipitation and separation of said sodium ions, potassium ions, and salt compounds.

In addition to the aforementioned components and characteristics, the method can be varied in any suitable manner. For example, the method may be implemented or repeated as needed to achieve the desired lithium purity level. In this example, the method may be organized such that certain implementations are performed either in a continuous and ongoing process or intermittent as needed.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which:

FIG. 1 depicts a schematic of an exemplary embodiment of the disclosed method.

DETAILED DESCRIPTION OF THE INVENTION

Reference throughout this specification to "one embodiment," "an embodiment," "alternative exemplary embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of pretreatment processes to concentrate lithium salts, electrolysis cells, electro-dialyzer cells, lithium and non-lithium metal salts, method steps, and treatments, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A method for producing lithium as a product or intermediate product is disclosed. As discussed above, solubility differences of the various lithium and non-lithium salts can be used to increase the concentration of lithium ions in a cell feed stream relative to non-lithium cations that can cause a problems with a lithium conductive membrane. Table 1, below compares the solubility of some alkali metal chlorides, sulfates, and hydroxides.

TABLE 1

Solubility of Selected Alkali Metal Salts
g/100 mL (20° C.)

| Cation | Anion | | |
|---|---|---|---|
| | Chloride | Sulfate | Hydroxide |
| Lithium | 83.5 | 34.8 | 12.3 |
| Sodium | 35.9 | 19.5 | 109 |
| Potassium | 34.2 | 11.1 | 112 |

The data reported in Table 1 indicate that lithium hydroxide is much less soluble compared to sodium and potassium hydroxide. This means that as the concentration of mixed lithium, sodium, and potassium hydroxides increases, the lithium hydroxide will precipitate before the corresponding sodium and potassium hydroxides.

The data reported in Table 1 further indicate that lithium chloride and lithium sulfate is much more soluble compared to the corresponding sodium and potassium chlorides and sulfates. This means that as the concentration of mixed lithium, sodium, and potassium chlorides and sulfates increases, the sodium and potassium chlorides and sulfates will precipitate before the corresponding lithium chloride and sulfate.

The differential solubility of alkali metal chlorides, sulfates, and hydroxides may be used to concentrate and separate lithium salts from non-lithium salts.

Figure 1:
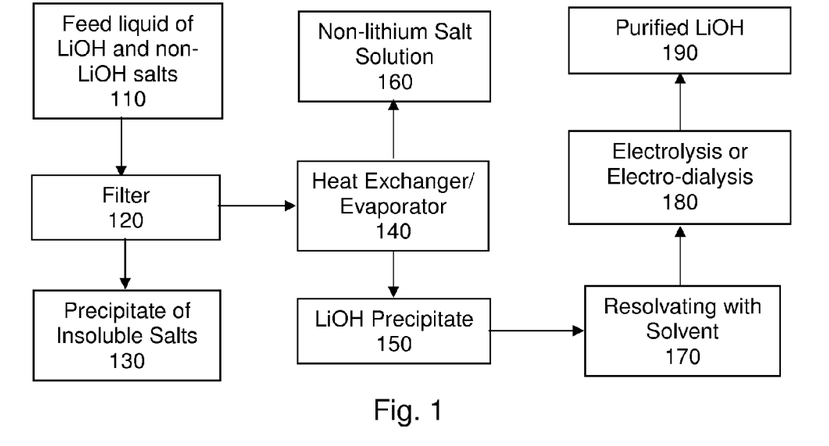
FIG. 1 depicts a schematic of a two-compartment electrolysis cell with a LiSICON membrane dividing the two compartments and lithium ions being transported through the membrane.

Referring now to FIG. 1, a feed liquid of mixed hydroxide salts 110 containing lithium hydroxide is provided, with the objective of recovering or extracting the lithium. The feed liquid 110 may contain non-lithium alkali ions, such as sodium and potassium ions, divalent and trivalent cations, such as magnesium, calcium, and aluminum cations. The feed liquid 110 is initially filtered 120 to remove insoluble precipitates 130. The filtrate, containing predominantly alkali ion hydroxides, passes through the filter 120. The filtered feed liquid passes through a heat exchanger and evaporator 140 to remove water. As the concentration of LiOH increases to saturation, the LiOH precipitates 150 and is recovered through conventional liquid/solid separation techniques, such as filtering, centrifuging, etc. The filtrate, comprising predominantly a non-lithium salt solution 160, is removed for further processing or recycling. The LiOH precipitate 150 is resolvated using a solvent 170, such as pure or de-ionized water. The resolvated lithium hydroxide is then further processed using an electrolytic process, such as either electrolysis or electro-dialysis 180. One possible product of the electrolytic process 180 is purified LiOH 190.

Figure 2:
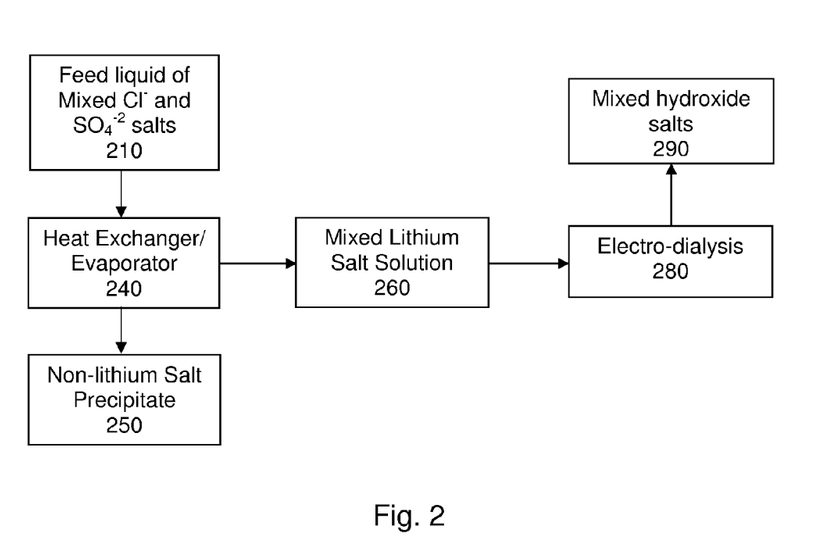
FIG. 2 depicts another schematic of an exemplary embodiment of the disclosed method.

Referring now to FIG. 2, a feed liquid of mixed chloride and sulfate salts 210 containing lithium chloride and/or lithium sulfate is provided, with the objective of recovering or extracting the lithium. The feed liquid 210 may contain non-lithium alkali metal salts, such as sodium and potassium chlorides and sulfates. The feed liquid 210 is introduced into a heat exchanger and evaporator 240 to remove water. As the concentration of non-lithium alkali metal chlorides and/or sulfates increases to saturation, the non-lithium alkali metal salts precipitate 250 and are recovered through conventional liquid/solid separation techniques, such as filtering, centrifuging, etc. The filtrate, comprising predominantly a lithium salt solution 260, but which may also contain significant amounts of non-lithium salts, is introduced into an electro-dialysis cell 280 to convert the mixed chloride and sulfate salts into the corresponding hydroxide salts 290. The mixed hydroxide salts 290 may be further processed as described in relation to FIG. 1 to produce purified LiOH.

The following experimental results are given to illustrate various embodiments within the scope of the present invention. These are given by way of example only, and it is understood that the following results are not comprehensive or exhaustive of the many types of embodiments of the present invention that can be prepared in accordance with the present invention.

Example 1

Figure 3:
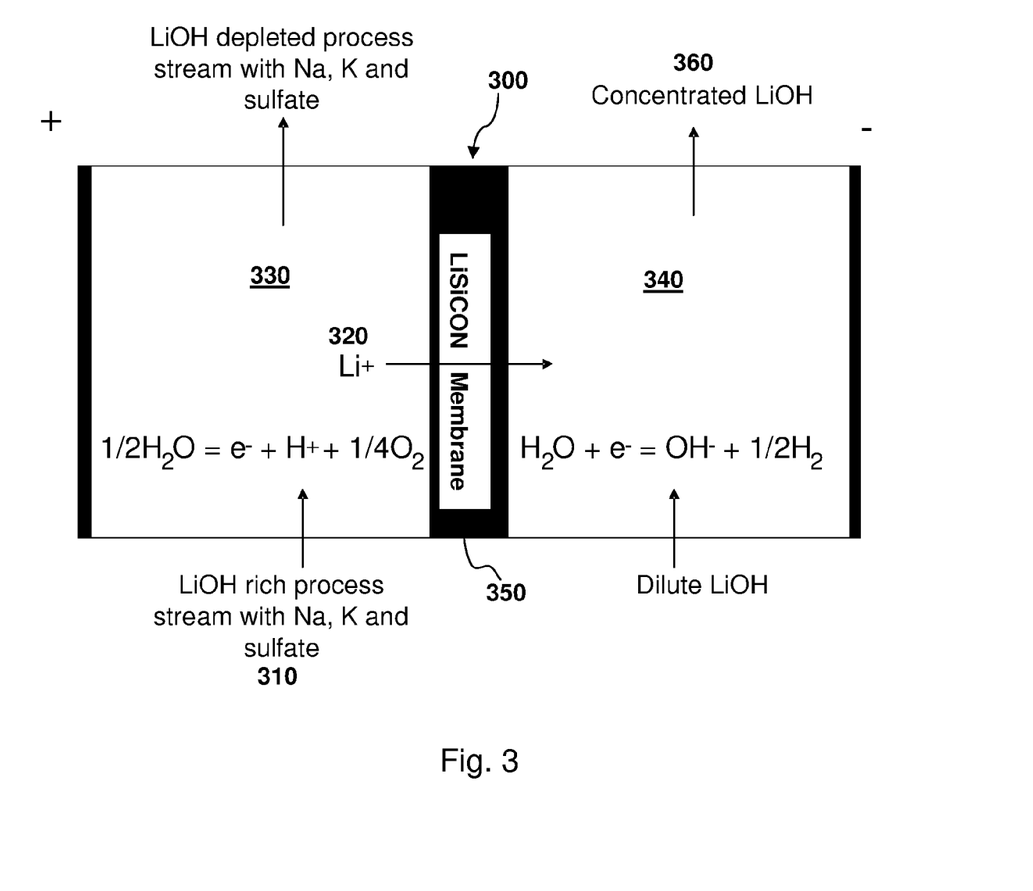
FIG. 3 depicts a schematic of an exemplary embodiment wherein purified lithium hydroxide is produced through electrolysis.

A stream of process liquids containing about 4 M (mole per liter) to 5 M $Li^+$, 0.05-0.15 M $Na^+$, 0.03-0.12 M $K^+$, 0.04-0.1 $SO_4^{-2}$, 4.71 M $OH^-$, and there also was some $Ca^{+2}$, $Mg^{+2}$, and $Al^{+3}$, was processed to separate LiOH with high yield and high purity. A two compartment electrolysis cell 300, such as shown in FIG. 3, was used to recover lithium from this process stream 310. FIG. 3 shows the principle of operation of a LiSICON two compartment cell. Lithium ions 320 are transferred from the anode (+) compartment 330 to the cathode (−) compartment 340 via the LiSICON 350 membrane. Pure LiOH 360 is recovered from the catholyte 340 compartment. The described LiSICON two compartment cell 300 was operated using the above process stream 310 as the anolyte solution. The electrolysis was conducted at 15 $mA/cm^2$ of LiSICON membrane area. The cell was able to operate for only a short time (~1 hr.) before the voltage started increasing, presumably due to influence of $Na^+$ and $K^+$ ions on the LiSICON membrane 350.

Figure 4:
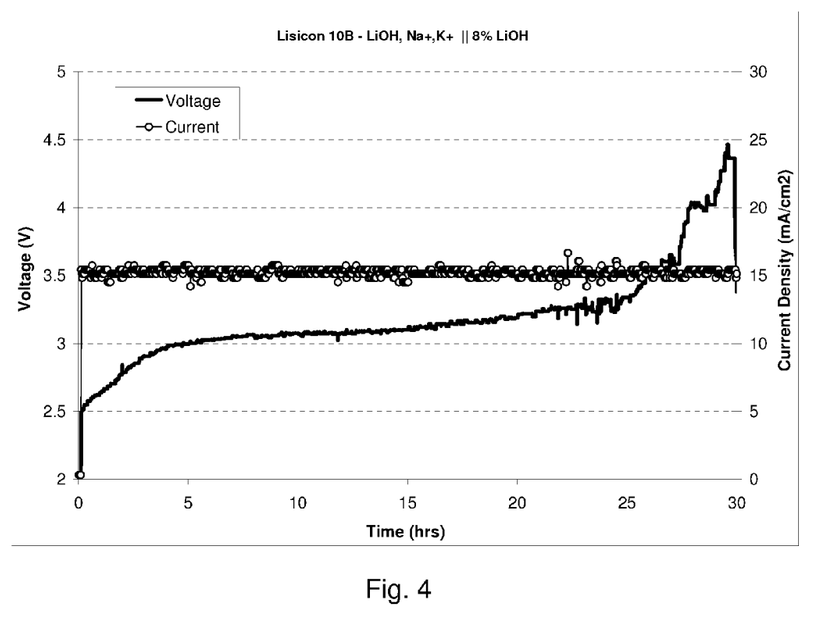
FIG. 4 depicts experiment results plotting voltage and current vs. time, and shows the effect of potassium and sodium on the voltage across the membrane.

In a second experiment using a fresh LiSICON membrane, the $Na^+$ and $K^+$ ion concentration was reduced by 10 fold in the process stream 310, while keeping the LiOH concentration the same. The voltage and current versus the time data for the electrolysis cell was measured and shown in FIG. 4. The data shows that the voltage has increased once the operation time has crossed 25 hours.

Figure 5:
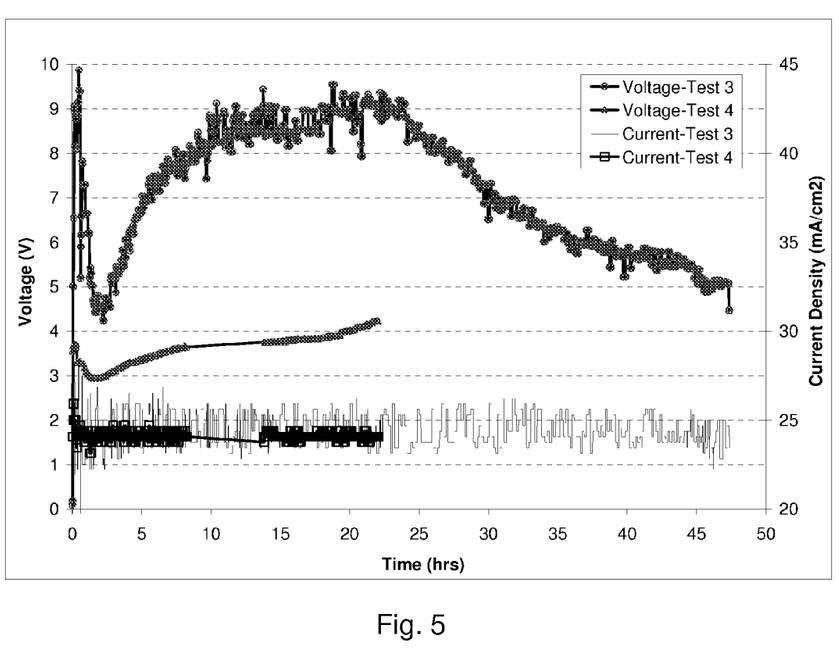
FIG. 5 depicts experiment results plotting voltage and current vs. time for a feed stream containing or no competing sodium and potassium ions.

Finally a third and fourth experiments were conducted with LiOH without any $Na^+$ and $K^+$ ion concentration and the data is shown in FIG. 5. These tests were conducted at a current density of 25 mA per sq.cm of membrane area.

Example 2

Figure 6:
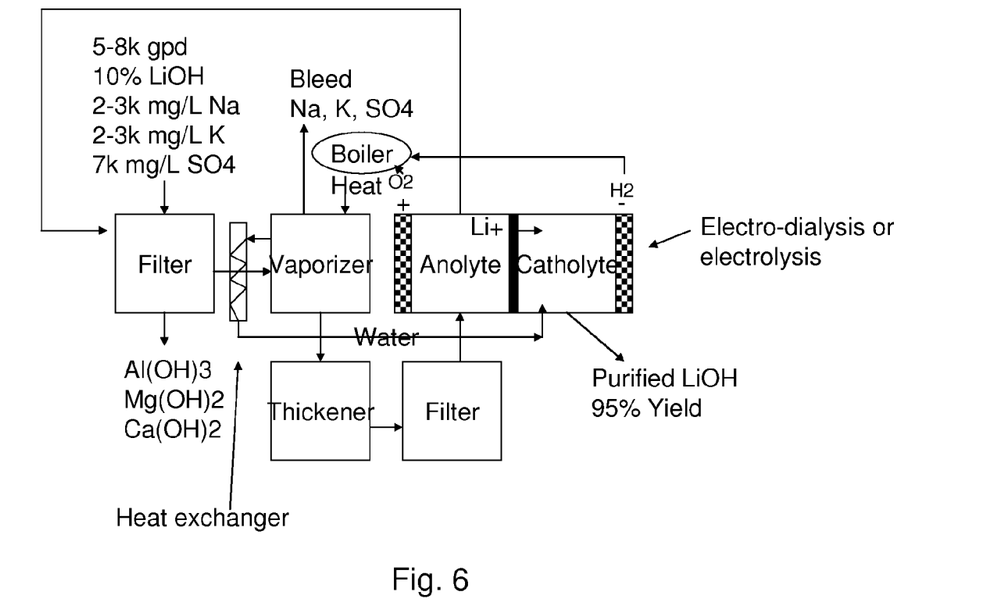
FIG. 6 depicts a schematic of an exemplary embodiment of the disclosed method.

A schematic representation of several steps of this example is shown in FIG. 1. This example describes one possible process for recovering or extracting lithium from a feed stream containing mixture of lithium hydroxide and other non-lithium salts. Specifically, the feed stream contained about 10% LiOH, about 2-3 g/L $Na^+$, about 2-3 g/L $K^+$, and about 7 g/L $SO_4^{-2}$. First the feed stream is filtered to remove Ca, Mg, and Al oxides and hydroxides. The stream was heated to vaporize approximately 80-90% of the water resulting in the precipitation of about 80-90% of the lithium in the form of lithium hydroxide hydrate leaving sodium, potassium and most of the sulfate in solution. The amount of water to be evaporated can be decreased by the addition of alcohol to the aqueous solution. The solubility of lithium hydroxide decreases considerably in the presence of ethanol, producing a drowning-out crystallization as reported by Graber et al. in Cryst. Res. Technol. 43(6), pg. 616-625, 2008. The sulfates have negligible solubility in alcohol so they remain solubilized in the aqueous phase. Another advantage of crystallization of lithium hydroxide hydrate by alcohol co-solvent addition is that the process can be carried out at a room temperature and does not require the use of vacuum. This lithium hydroxide hydrate was recovered and then redissolved and fed into an electrolyzer with the overall process scheme as shown in FIG. 6. The electrolysis of the aqueous salt stream in an electrodialysis/electrolytic cell is well known. The resulting product from the cathode chamber was a stream of purified lithium hydroxide. The spent anolyte stream may optionally be fed back into the vaporizer stream for additional lithium recovery. With the very low sodium and potassium content in the electrolyzer stream, the lithium conductive membrane was run with current run in reverse 1% of the time to purge sodium and potassium cations from the membrane.

Example 3

Figure 7:
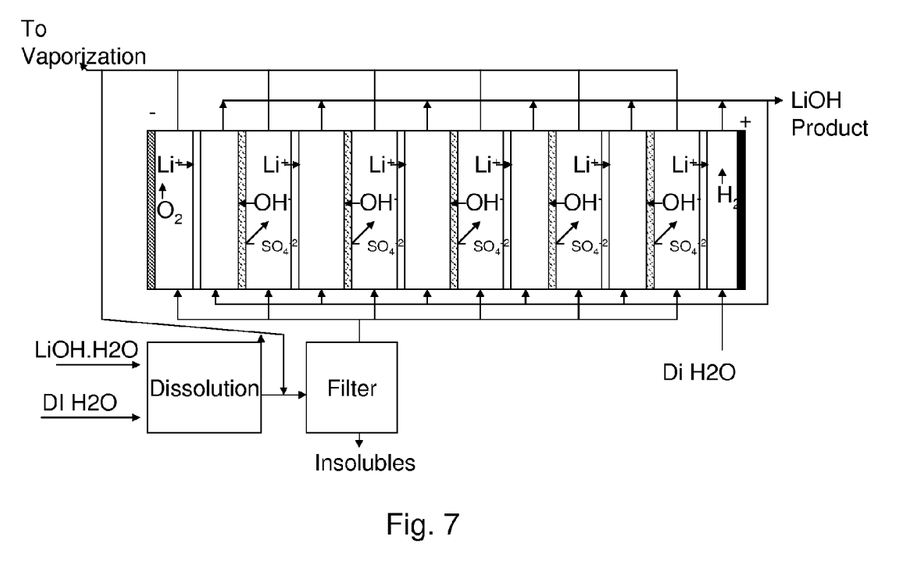
FIG. 7 depicts a schematic of a stacked electro-dialyzer that may be used in certain disclosed embodiments.

The same process stream as in Example 2 was used. Lithium hydroxide hydrate was redissolved and fed into an electro-dialyzer as shown schematically in FIG. 7. The electro-dialyzer featured lithium conductive ceramic membranes and monovalent anion exchange membranes (Neosepta ACS). The resulting product from the cathode chamber was a stream of purified lithium hydroxide. Optionally, the anolyte stream was fed back into the vaporizer stream for additional lithium recovery. With the very low sodium and potassium content in the electrolyzer stream, the lithium conductive membrane was run with current run in reverse 1% of the time to purge sodium and potassium cations from the membrane.

In Examples 2 and 3 the starting feed stream was primarily alkaline and the lower solubility of lithium hydroxide hydrate was utilized to provide a pre-purification step upstream of the electrolyzer or electro-dialyzer. In the next example the starting feed stream is more neutral and primarily a solution of chlorides.

Example 4

The starting stream is comprised of primarily a sodium and potassium chloride in water at approximately 3000 ppm dissolved salts. The lithium concentration is about 13 ppm. In the initial stream of chlorides, the lithium salt has highest solubility and is the least concentrated. Approximately 99% of the water was evaporated. When most of the water was evaporated, sodium chloride and potassium chloride precipitated. The initial LiCl on a molar basis relative to the other salts was only 4% and 96% NaCl and KCl, but the salt still in solution just before LiCl begins to precipitate was about 65% LiCl and only 35% NaCl+KCl on a molar basis. This lithium rich stream entered a 3 compartment electrolysis cell 800, shown in FIG. 8. The electrolysis cell 800 includes conventional polymer ion exchange membranes. An anion exchange membrane 810 at the anode compartment 815 and a cation exchange membrane 820 at the cathode compartment 825 were used. The alkali ions pass through the cation exchange membrane 820 into the cathode compartment 825 where they combine with hydroxide ions formed at the cathode and leave the electrolysis process as hydroxides rather than chlorides.

Figure 8:
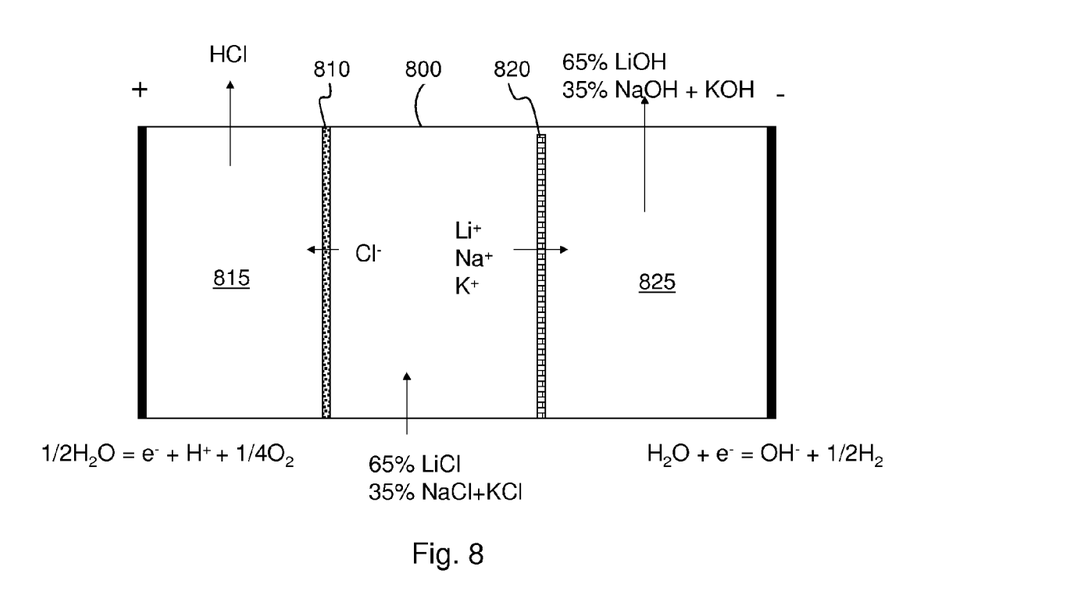
FIG. 8 depicts a schematic of an exemplary embodiment of a three-compartment cell that may be used in certain disclosed embodiments.

Among these mixed hydroxide salts, lithium hydroxide hydrate has the lowest solubility and was the most plentiful so it began precipitating. After initial precipitation and crystallization, the stream was further vaporized resulting in more lithium hydroxide hydrate precipitation while the sodium and potassium hydroxide substantially stayed in solution. As before, the amount of water to be evaporated can be decreased by the addition of alcohol to the aqueous solution. The Lithium hydroxide hydrate is then redissolved and run through an electrodialysis as in Example 2 utilizing a LiSI- CON membrane. The product was a pure lithium hydroxide which can be used as is or be converted to a different salt by adding the appropriate acid.

Of course while water will often be the solvent utilized to re-solvate the lithium salt, other solvents may be used for that purpose as well, including alcohols, and non-aqueous solvents In one embodiment, a method for producing a product or intermediate product comprised of lithium from a first feed liquid is disclosed. The first feed liquid may be pretreated by precipitating and a recovering a salt comprised of lithium hydroxide from the first feed. The recovered salt may then be re-solvated to produce a second feed liquid to be fed to an electrolysis cell. In the cell, lithium is transported through an inorganic solid electrolyte membrane under the influence of an electrical field to produce said product or intermediate product. In one embodiment, the pretreatment includes subjecting the first feed liquid to water evaporation resulting in the precipitation of a salt comprising lithium hydroxide. The pretreatment may also include subjecting first feed liquid to alcohol addition followed by water evaporation resulting in the precipitation of lithium hydroxide. The solvent for re-solvating lithium hydroxide may include water or a mixture containing water. In one embodiment, the solvent for re-solvating lithium hydroxide is a polar non-aqueous solvent or alcohol mixture thereof.

The cell can be an electrolyzer cell having at least one anode, at least one cathode and at least one lithium ion conductive inorganic membrane. In one embodiment, the cell is an electro-dialyzer with at least one anode, at least one cathode, at least one lithium ion conductive inorganic membrane, and at least one anion exchange membrane.

The cell may include an anion exchange membrane that is a monovalent anion exchange membrane.

A method of recovering or extracting lithium may use any of the devices described herein. In one embodiment, the method may include reversing the polarity of the cell on a periodic basis.

A method for producing a product or intermediate product comprised of lithium from a first feed liquid may include pretreating the first feed liquid by precipitating salt comprised of sodium chloride, potassium chloride or a mixture thereof. A second feed liquid may be recovered from the precipitated salt that is rich in lithium chloride. The method may include feeding the second feed liquid into an electrolysis cell, where lithium is transported through an inorganic solid electrolyte membrane under the influence of an electrical field to produce said product or intermediate product.

In one embodiment, the pretreatment includes subjecting first feed liquid to water evaporation resulting in the precipitation of a salt comprising sodium chloride and/or sodium sulfate. In another embodiment, the pretreatment includes subjecting first feed liquid to water evaporation resulting in the precipitation of potassium chloride and/or potassium sulfate.

In one embodiment, the method utilizes a two compartment electrolysis cell. In another embodiment, the method may utilize a three compartment electro-dialysis cell.

In one embodiment the method includes providing a first feed liquid comprises lithium chloride and other chlorides such as sodium or potassium chloride. It may also contain sulfates. The first feed liquid may undergo evaporation to precipitate, either fully or partially, the non-lithium salts. The remaining lithium chloride, and any un-precipitated sodium or potassium chloride salts form a second feed liquid. This second feed liquid is fed into the center compartment of a three compartment cell. The method includes forming mixed hydroxide salts in the cathode compartment in the three compartment cell. The method may further include fully or partially precipitating the lithium hydroxide hydrate from the mixed hydroxide salts. Then the lithium hydroxide hydrate may be resolvated or just recovered. The resolvated lithium hydroxide may become a third feed liquid which may be fed into an electrochemical cell, where lithium passes through an inorganic lithium conducing membrane under the influence of a potential. The inorganic membrane may be LiSICON or similar lithium ion conductive membrane. The method may then include the step of forming pure lithium hydroxide at a cathode. In one embodiment, the third feed liquid may be feed into an electro-dialysis cell having an inorganic lithium conducing membrane as described above.

While specific embodiments and examples of the present invention have been illustrated and described, numerous modifications come to mind without significantly departing from the spirit of the invention, and the scope of protection is only limited by the scope of the accompanying claims.

The invention claimed is:

1. A method for producing a lithium product or intermediate product comprising:
    pre-treating a first feed liquid comprising lithium hydroxide to precipitate a lithium hydroxide hydrate from the first feed liquid;
    recovering the lithium hydroxide hydrate precipitate;
    re-solvating the lithium hydroxide hydrate precipitate using a solvent to produce a second feed liquid comprising lithium hydroxide in solution;
    feeding the second feed liquid to an electrolysis cell, the cell comprising at least one inorganic solid electrolyte membrane comprising ceramic material configured to selectively transport the lithium ions, the membrane positioned between an anolyte compartment configured with an anode and a catholyte compartment configured with a cathode;
    transporting the lithium ions from the second feed liquid, wherein lithium is transported through the inorganic solid electrolyte membrane under the influence of an electric potential to produce said lithium product or intermediate product; and
    wherein the polarity of the electrolysis cell is periodically reversed.

2. The method of claim 1 wherein pre-treating the first feed liquid comprises subjecting the first feed liquid to water evaporation to precipitate the lithium hydroxide hydrate.

3. The method of claim 1 wherein pre-treating further comprises subjecting the first feed liquid to alcohol-addition to precipitate the lithium hydroxide hydrate.

4. The method of claim 1 wherein pre-treating further comprises subjecting the first feed liquid to alcohol-addition and water evaporation to precipitate the lithium hydroxide hydrate.

5. The method of claim 1 wherein the solvent for re-solvating lithium hydroxide comprises water.

6. The method of claim 1 wherein the solvent for re-solvating lithium hydroxide comprises a polar non-aqueous solvent.

7. The method of claim 1 where the electrolysis cell further comprises a center compartment and an anion exchange member between the inorganic solid electrolyte membrane and the anode compartment.

8. The method of claim 7 wherein the anion exchange membrane comprises a monovalent anion exchange membrane.

9. The method of claim 1 wherein the inorganic solid electrolyte membrane comprises LiSICON.

10. A method for producing a lithium product or intermediate product comprising:
- pre-treating a first feed liquid comprising lithium chloride or lithium sulfate to precipitate non-lithium salts from the first feed liquid to form a second feed liquid rich in lithium chloride or lithium sulfate;
- feeding the second feed liquid to an electro-dialysis cell comprising an anode compartment with an anode, which is separated from a center compartment by an anion exchange membrane and a cathode compartment with a cathode which is separated from the center compartment by an cation exchange membrane;
- applying an electric potential to the electro-dialysis cell to form hydroxide ions in the cathode compartment, wherein lithium and non-lithium cations pass from the center compartment through the cation exchange membrane into the cathode compartment to form a mixture of lithium hydroxide and non-lithium hydroxide salts;
- evaporating the mixture of lithium hydroxide and non-lithium hydroxide salts to precipitate the lithium hydroxide hydrate from the remaining mixture; and
- recovering the precipitated lithium hydroxide hydrate to form a lithium product or intermediate product.

11. The method of claim 10 further comprising:
- re-solvating the precipitated lithium hydroxide hydrate to form a third feed liquid;
- feeding the third feed liquid to an electrochemical cell having an inorganic lithium ion conductive membrane;
- conducting lithium through the inorganic lithium ion conductive membrane under influence of an electric potential to form lithium hydroxide product or intermediate product.

12. The method of claim 11 wherein the inorganic lithium ion conductive membrane comprises a LiSICON membrane.

13. The method of claim 11 wherein a polarity of the electric potential of the electrochemical cell is periodically reversed.

14. The method of claim 11 wherein the solvent for re-solvating lithium hydroxide hydrate comprises water.

15. The method of claim 11 wherein the solvent for re-solvating lithium hydroxide hydrate comprises a polar non-aqueous solvent.

16. The method of claim 10 wherein said pre-treating further comprises subjecting the first feed liquid to a water evaporation to precipitate non-lithium salts.

17. The method of claim 10 wherein the non-lithium salts comprise sodium chloride, potassium chloride, and mixtures thereof.

18. The method of claim 10 wherein the non-lithium salts comprise sodium sulfate, potassium sulfate, and mixtures thereof.

19. The method of claim 10 wherein pre-treating the first feed liquid comprises subjecting the first feed liquid to water evaporation to precipitate non-lithium salts from the first feed liquid.

* * * * *